(12) United States Patent
Lee et al.

(10) Patent No.: US 12,175,061 B2
(45) Date of Patent: Dec. 24, 2024

(54) APPARATUS AND METHOD OF CONTROLLING IMAGE DISPLAY

(71) Applicant: HANWHA VISION CO., LTD., Seongnam-si (KR)

(72) Inventors: Sang Yun Lee, Seongnam-si (KR); Hyun Kyu Park, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

(21) Appl. No.: 18/183,982

(22) Filed: Mar. 15, 2023

(65) Prior Publication Data

US 2023/0297220 A1   Sep. 21, 2023

(30) Foreign Application Priority Data

Mar. 16, 2022   (KR) .................. 10-2022-0032819

(51) Int. Cl.
*G06F 3/04845* (2022.01)
*G06F 3/0485* (2022.01)
*G06F 3/0488* (2022.01)
*G06V 20/20* (2022.01)

(52) U.S. Cl.
CPC ........ *G06F 3/04845* (2013.01); *G06F 3/0485* (2013.01); *G06F 3/0488* (2013.01); *G06V 20/20* (2022.01)

(58) Field of Classification Search
CPC .. G06F 3/04845; G06F 3/0485; G06F 3/0484; G06F 3/0488; G06F 3/0487; G06V 20/20; G06V 20/00
USPC ....................................................... 715/764
See application file for complete search history.

(56) References Cited

U.S. PATENT DOCUMENTS

| 10,877,659 | B2 | 12/2020 | Helfman | |
|---|---|---|---|---|
| 2010/0289825 | A1* | 11/2010 | Shin | G06F 3/04883 345/173 |
| 2011/0019239 | A1* | 1/2011 | Kojima | G06F 3/0488 358/401 |
| 2013/0044962 | A1* | 2/2013 | Kim | G06F 16/58 455/566 |
| 2013/0265311 | A1* | 10/2013 | Na | G06T 3/40 345/428 |
| 2013/0329114 | A1* | 12/2013 | Kim | H04N 5/2628 348/333.12 |

(Continued)

FOREIGN PATENT DOCUMENTS

| JP | 2001325297 A | * 11/2001 |
|---|---|---|
| KR | 10-1307349 B1 | 9/2013 |

(Continued)

*Primary Examiner* — Hwei-Min Lu
(74) *Attorney, Agent, or Firm* — McLean IP Global; Jason Y. Pahng

(57) ABSTRACT

Provided is an image display system displaying an image obtained from an image capturing device. A method of operating a terminal in the image display system includes displaying a first user interface (UI) screen including the image through a display, obtaining a first user input indicating a pointing position in the image, generating a first enlarged image of an enlargement target area corresponding to the pointing position, in response to the first user input, and displaying a second UI screen including the first enlarged image through the display, wherein an input time of the first user input is greater than or equal to a preset threshold time.

20 Claims, 11 Drawing Sheets

(56) References Cited

U.S. PATENT DOCUMENTS

| | | | | |
|---|---|---|---|---|
| 2014/0181737 | A1* | 6/2014 | Hwang | G06F 1/1692 |
| | | | | 715/800 |
| 2017/0118413 | A1* | 4/2017 | Shin | H04N 23/62 |
| 2017/0147174 | A1* | 5/2017 | Olejniczak | H04N 21/4223 |
| 2019/0188452 | A1* | 6/2019 | Chen | G06T 3/40 |
| 2021/0216196 | A1* | 7/2021 | Gilra | G06F 3/0484 |

FOREIGN PATENT DOCUMENTS

| | | | | |
|---|---|---|---|---|
| KR | 10-1326994 | B1 | 11/2013 | |
| KR | 2014081087 | A * | 7/2014 | G06F 3/0481 |
| KR | 10-1750872 | B1 | 7/2017 | |

\* cited by examiner

APPARATUS AND METHOD OF CONTROLLING IMAGE DISPLAY

CROSS-REFERENCE TO RELATED APPLICATION

This application is based on and claims priority under 35 U.S.C. § 119 to Korean Patent Application No. 10-2022-0032819, filed on Mar. 16, 2022, in the Korean Intellectual Property Office, the disclosure of which is incorporated by reference herein in its entirety.

BACKGROUND

1. Field

The disclosure generally relates to an image display system displaying, on a display, an image obtained from an image capturing device, and more particularly, to an apparatus and method of displaying, on a display, an enlarged image related to a pointing position desired by a user in an image in response to a user input.

2. Description of the Related Art

A terminal is connected to a computing device through a network to instruct an electronic device responsible for inputting/outputting data in a computing system. In the related art, terminals were mainly used for receiving broadcasts or for voice communication, but as technology rapidly develops, terminals have been developed to perform various functions in response to users' needs, such as capturing images, recording and playback of music or image files, or the like, in addition to voice communication. In particular, recent terminals have been implemented in the form of multimedia players that provide visual content, such as images captured by cameras, to users through displays.

To implement complex functions of multimedia players, various attempts have been applied to terminals in terms of hardware and software. According to an example, a user interface (UI) environment is provided to simply manipulate a terminal. That is, the terminal provides a UI screen to a user through a display and changes the UI screen in real time according to user inputs, such as a touch, a tap, a drag, and a click, to quickly deliver information requested by the user.

According to the related art, in a system in which a terminal provides a UI screen displaying an image on a display, the terminal may not specifically display an enlarged image related to a pointing position desired by the user. According to an example, when an image captured by a closed-circuit television (CCTV) is displayed on a terminal and a user wants to enlarge a pointing position, a terminal had to execute a separate enlargement function and continuously receive additional user inputs for enlargement. That is, the terminal had to perform a number of procedures to generate an enlarged image within the image, and it was difficult to respond to the user's real-time inputs.

The above-mentioned technology is technical information that the inventor possessed for derivation of the disclosure or acquired during the derivation process of the disclosure, and does not necessarily indicate a known technology disclosed to the general public before filing the disclosure.

SUMMARY

Provided are an apparatus and method of displaying an enlarged image related to a pointing position desired by a user in an image in response to a user input in an image display system.

Provided are an apparatus and method of simply displaying an enlarged image according to a changed pointing position in an image display system.

Provided are an apparatus and method of quickly and accurately providing information requested by a user by changing a user interface (UI) screen in real time based on a simple user input, such as a user's touch, tap, drag, and click, in an image display system.

Additional aspects will be set forth in part in the description which follows and, in part, will be apparent from the description, or may be learned by practice of the present disclosure.

According to an aspect of the disclosure, a method of operating a terminal configured to display an image obtained from an image capturing device includes displaying a first user interface (UI) screen including the image through a display, obtaining a first user input indicating a pointing position in the image, generating a first enlarged image of an enlargement target area corresponding to the pointing position, in response to the first user input, and displaying a second UI screen including the first enlarged image through the display, wherein an input time of the first user input is greater than or equal to a preset threshold time.

The generating of the first enlarged image may include obtaining a second user input to determine the enlargement target area, and generating an enlarged image based on the second user input.

The first user input may include at least one of a touch input, a click input, and a tap input, and the second user input may include at least one of a scrolling input and a sliding touch input.

The first enlarged image may be displayed as an overlay above and near the pointing position in the image.

The method of operating the terminal according to the disclosure may further include obtaining a third user input indicating a change in pointing position in the image, generating a second enlarged image related to an area including a pointing position being changed according to the third user input, and displaying a third UI screen including the second enlarged image.

The third user input may include a drag input consecutive to the first user input.

The generating of the first enlarged image may include transmitting an image request message including information about the image and information about the pointing position to a server, receiving, from the server, a server image corresponding to the information about the image and the information about the pointing position, which are included in the image request message, and generating the first enlarged image based on the server image.

The method may further include recognizing an object by using the image, and the generating of the first enlarged image may include generating the first enlarged image, when a distance between a position of the recognized object and the pointing position is less than or equal to a threshold value, and the input time of the first user input is greater than or equal to the preset threshold time.

The displaying of the second UI screen may include displaying the first enlarged image as an overlap above and near the position of the recognized object.

When a plurality of first user inputs indicating a plurality of pointing positions in the image are input, the generating of the first enlarged image may include generating a plurality of first enlarged images corresponding to the plurality of pointing positions, and the displaying of the second UI screen may include displaying the second UI screen including each of the plurality of first enlarged images through the display.

According to another aspect of the disclosure, a terminal configured to display an image obtained from an image capturing device, the terminal including a processor, wherein the processor controls to display a first UI screen including the image through a display, obtain a first user input indicating a pointing position in the image, generate a first enlarged image related to an enlargement target area corresponding to the pointing position in response to the first user input, and display a second UI screen including the first enlarged image through the display, and an input time of the first user input is greater than or equal to a preset threshold time.

The processor may be configured to obtain a second user input to determine the enlargement target area and generate an enlarged image based on the second user input.

The processor may control to obtain a third user input indicating a change in pointing position in the image, generate a second enlarged image related to an area including a pointing position being changed according to the third user input, and display a third UI screen including the second enlarged image.

The terminal configured to display an image, according to the disclosure, may further include a communicator configured to transmit and receive data, wherein the processor may be configured to transmit an image request message including information about the image and information about the pointing position to a server, receive, form the server, a server image corresponding to the information about the image and information about the pointing position, which are included in the image request message, and generate the first enlarged image based on the server image.

The processor may be configured to recognize an object by using the image and generate the first enlarged image, when a distance between a position of the recognized object and the pointing position is less than or equal to a threshold value, and the input time of the first user input is greater than or equal to the preset threshold time.

The processor may control to display the first enlarged image as an overlay above and near the position of the recognized object.

According to another aspect of the disclosure, a computer readable medium having instructions executable by a processor stored thereon, the instructions includes instructions to display a first UI screen including an image obtained from an image capturing device, instructions to obtain a first user input indicating a pointing position in the image, instructions to generate a first enlarged image related to an enlargement target area corresponding to the pointing position, in response to the first user input, and instructions to display a second UI screen including the first enlarged image through a display, wherein an input time of the first user input is greater than or equal to a preset threshold time.

The computer readable storage medium according to the disclosure having instructions executable by a processor stored thereon, the instructions include instructions to transmit an image request message including information about the image and information about the pointing position to a server, instructions to receive, from the server, a server image corresponding to the information about the image and the information about the pointing position, which are included in the image request message, and instructions to generate the first enlarged image based on the server image.

The computer readable storage medium according to the disclosure having instructions executable by a processor stored thereon, the instructions include instructions to recognize an object by using the image, and instructions to generate the first enlarged image, when a distance between a position of the recognized object and the pointing position is less than or equal to a threshold value, and the input time of the first user input is greater than or equal to the preset threshold time.

Each of the various aspects and features of the disclosure are defined in the appended claims. Combinations of features of the dependent claims may be combined with features of the independent claims as appropriate, not just those explicitly set forth in the claims.

In addition, one or more features selected from any one example described in the disclosure may be combined with selected one or more features of any other examples described in the disclosure, alternative combinations of these features may at least partially alleviate one or more technical issues discussed in the disclosure, or at least partially alleviate technical issues discernable by one skilled in the art from the disclosure. Further, a particular combination or permutation of the disclosed features so formed is possible, unless it is understood by a person skilled in the art to be incompatible.

In any described example implementation, two or more physically separate components may alternatively be integrated into a single component, where such integration is possible, it may be integrated into a single component, and if the same function is performed by the single component thus formed, the integration is possible. On the contrary, a single component in any example described in the disclosure may alternatively be implemented as two or more separate components that achieve the same function, where appropriate.

It is an object of the disclosure to at least partially solve, alleviate, or eliminate at least one of the problems and/or disadvantages associated with the related art. The present disclosure aims to provide at least one of the advantages described below.

BRIEF DESCRIPTION OF THE DRAWINGS

The above and other aspects, features, and advantages of certain examples of the disclosure will be more apparent from the following description taken in conjunction with the accompanying drawings, in which.

DETAILED DESCRIPTION

Figure 1:
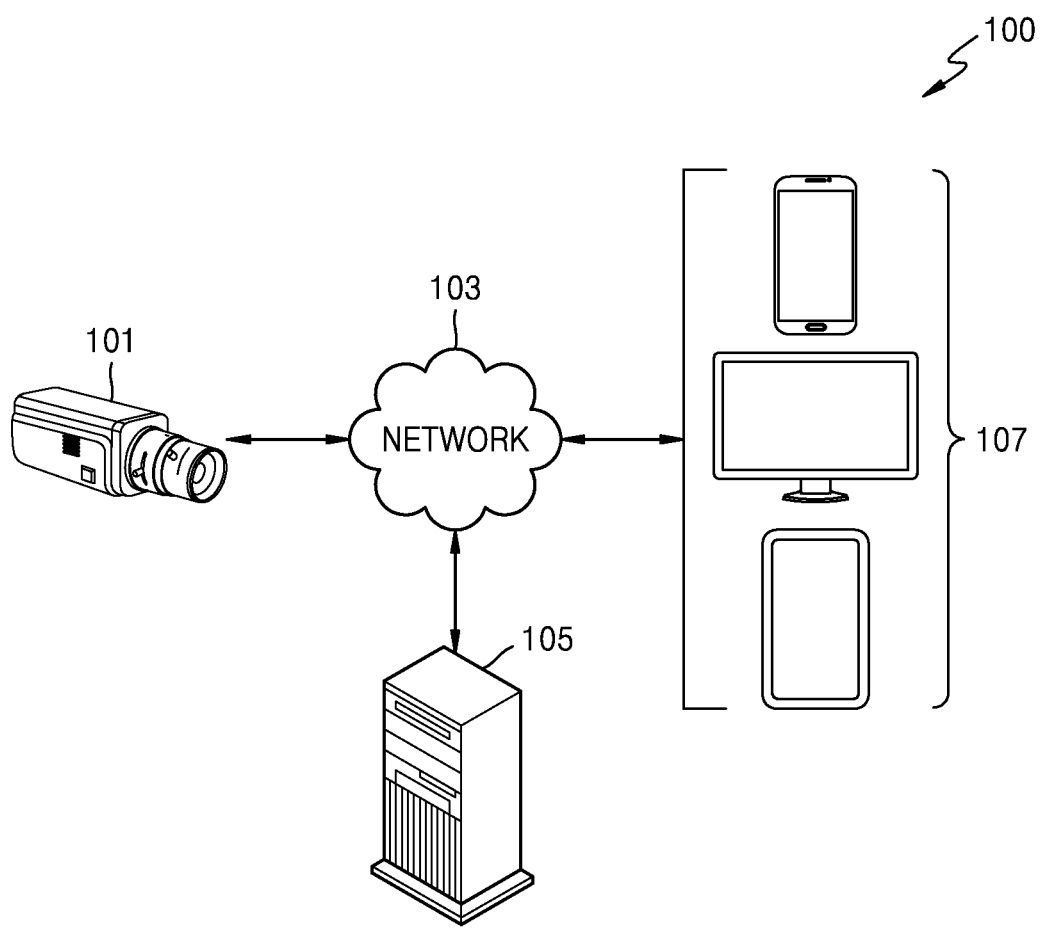
FIG. 1 illustrates an image display system according to the present disclosure.

Reference will now be made in detail, examples of which are illustrated in the accompanying drawings, wherein like reference numerals refer to like elements throughout. In this regard, the present disclosure may have different forms and should not be construed as being limited to the descriptions set forth herein. Accordingly, the present disclosure is merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms used in the disclosure are only used to describe a particular example, and may not be intended to limit the scope of other examples. An expression used in the singular may encompass the expression of the plural, unless it has a clearly different meaning in the context. Terms used herein, including technical or scientific terms, may have the same meaning as commonly understood by one of ordinary skill in the art described in the disclosure. Among the terms used in the disclosure, terms defined in general dictionaries may be interpreted as having the same or similar meanings as the meanings in the context of the related art, and unless explicitly defined in the disclosure, the terms are not interpreted in an ideal or overly formal sense. In some cases, even terms defined in the disclosure may not be interpreted to exclude examples of the disclosure.

In the disclosure described below, a hardware access method is described as an example. However, because the disclosure include technology using both hardware and software, the disclosure do not exclude software-based access methods.

Hereinafter, the disclosure relates to an apparatus and method of displaying, on a display, an image obtained from an image capturing device. In particular, the disclosure describes a technique of displaying, on a display, an enlarged image related to a pointing position desired by a user in an image in response to a user input in an image display system.

Hereinafter, the present disclosure is described in detail so that those skilled in the art can easily implement the disclosure with reference to the accompanying drawings. However, because the technical idea of the disclosure may be implemented in various forms, it is not limited to the examples described herein. In the description of the disclosure, when it is determined that a detailed description of a related known technology may obscure the gist of the technical idea of the disclosure, a detailed description of the known technology is omitted. The same or similar components are given the same reference numerals, and duplicate descriptions thereof are omitted.

In the disclosure, when an element is described as being "connected" to another element, this includes the case of being "directly connected", as well as the case of being "indirectly connected" with another element therebetween. When an element "includes" another element, this means that it does not preclude the presence of another element in addition to the other element, and another element may be further included, unless otherwise stated.

Some examples may be described as functional block structures and various processing operations. Some or all of these functional blocks may be implemented with any number of hardware and/or software components that perform a particular function. For example, the functional blocks of the disclosure may be implemented by one or more microprocessors or circuit configurations for a certain function. The functional blocks of the disclosure may be implemented in a variety of programming or scripting languages. The functional blocks of the disclosure may be implemented as an algorithm being executed on one or more processors. A function performed by one functional block of the disclosure may be performed by a plurality of function blocks, or functions performed by a plurality of function blocks in the disclosure may also be performed by one function block. In addition, the disclosure may employ the related art for electronic environment setting, signal processing, and/or data processing.

In addition, in the disclosure, to determine whether a condition is satisfied or fulfilled, an expression of more than or less than is used, but this is only a description for expressing an example and does not exclude more or less description. Conditions described as 'greater than or equal to' may be replaced with "more than", conditions described as 'less than or equal to' may be replaced with "less than", and conditions described as "greater than or equal to and 'less than or equal to' may be replaced with 'more than and less than".

In addition, in the disclosure, an image refers to a visualized image to visually capture information by light rays arranged on a plane or space, or media. An image may include a still image and a video.

FIG. 1 illustrates an image display system 100 according to the present disclosure. The image display system 100 indicates a system in which an image captured by an image capturing device 101 is transmitted to a server 105 or a terminal 107 through a network 103, and the terminal 107 displays the image by using a display. Referring to FIG. 1, the image display system 100 includes the image capturing device 101, the network 103, the server 105, and the terminal 107. FIG. 1 is an example for explanation of the disclosure, and the number of devices connected to the network 103 in the image display system 100 according to the disclosure is not limited.

The image capturing device 101 indicates a device that obtains an image by capturing an image of a preset area for monitoring or security purposes. The image capturing device 101 may transmit an obtained image to another device through the network 103. According to the disclosure, the image capturing device 101 may include a pan/tilt/zoom controllable image obtaining device and a fixed type image obtaining device. The shape and type of the image capturing device 101 shown in FIG. 1 are examples and are not limited thereto, and any device that obtains an image and transmits the obtained image through a connected network may correspond to the image capturing device 101. The image capturing device 101 may capture an image of an object within a capturing area. The image capturing device 101 may transmit the captured image to another device through the network 103.

The network 103 indicates a network that connects communication between a plurality of devices by wire or wirelessly. According to the disclosure, the network 103 may include a wired network, such as local area network (LAN), wide area network (WAN), metropolitan area network (MAN), integrated service digital network (ISDN), or the like, and a wireless network, such as wireless LAN, code-division multiple access (CDMA), Bluetooth®, satellite communication, or the like. The network 103 may be a closed network having no points or nodes connected to an external network. That is, the network 103 may be a communication line connecting only predetermined components to each other. According to the disclosure, the network 103 may include a communication line connecting the image capturing device 101, the server 105, and the terminal 107 to each other.

The server 105 may be implemented as a computer device or a plurality of computer devices that communicate with the terminal 107 through a network to provide commands, codes, files, contents, services, or the like. According to the disclosure, an image captured by the image capturing device 101 may be stored in the server 105, and the server 105 may provide the image to the terminal 107 upon request. The terminal 107 may access the server 105 under control of at least one program and receive a service or content provided by the server 105.

The terminal 107 obtains information through the network 103 and instructs an electronic device that provides the obtained information to a user. The terminal 107 includes a fixed terminal implemented as a computer device, or a mobile terminal. According to the disclosure, the terminal 107 may include a smartphone, a mobile phone, a navigation device, a computer, a laptop computer, a digital broadcasting device, a personal digital assistant (PDA), a portable multimedia player (PMP), and a tablet personal computer (PC). The terminal 107 may communicate with at least one of the image capturing device 101 and the server 105 through the network 103 by using a wireless or wired communication method.

According to the disclosure, the terminal 107 may perform a function of displaying a user interface (UI) screen through a display. The terminal 107 may obtain an image through the network 103 or directly capture an image to display a UI screen including the image through at least one display. Here, the terminal 107 may receive a user input and change the UI screen in response to the user input. The terminal 107 may receive a user input, such as, a touch, a tap, a drag, and a click, and may change the UI screen in real time in response to the user input. The terminal 107 may provide information desired by the user by displaying, on at least one display, a UI screen changed in response to the user input.

According to the related art, a terminal performed complicated procedures to enlarge and display only a particular position on an image. That is, to display an enlarged image, the terminal separately called an enlargement program for enlarging the image and received a pointing position and magnification factor individually from the user to display the enlarged image. In this method, when the pointing position continuously changes, such as when obtaining an enlarged image of a moving object, it is difficult for the terminal to track the enlarged image of the changing position of the object in real time. On the contrary, the terminal 107 according to the disclosure changes and displays a UI screen in real time based on a simple user input, such as a touch, a tap, a drag, and a click, to quickly provide information requested by the user. A particular method of displaying, by the terminal 107, a UI screen is described in detail below.

Figure 2:
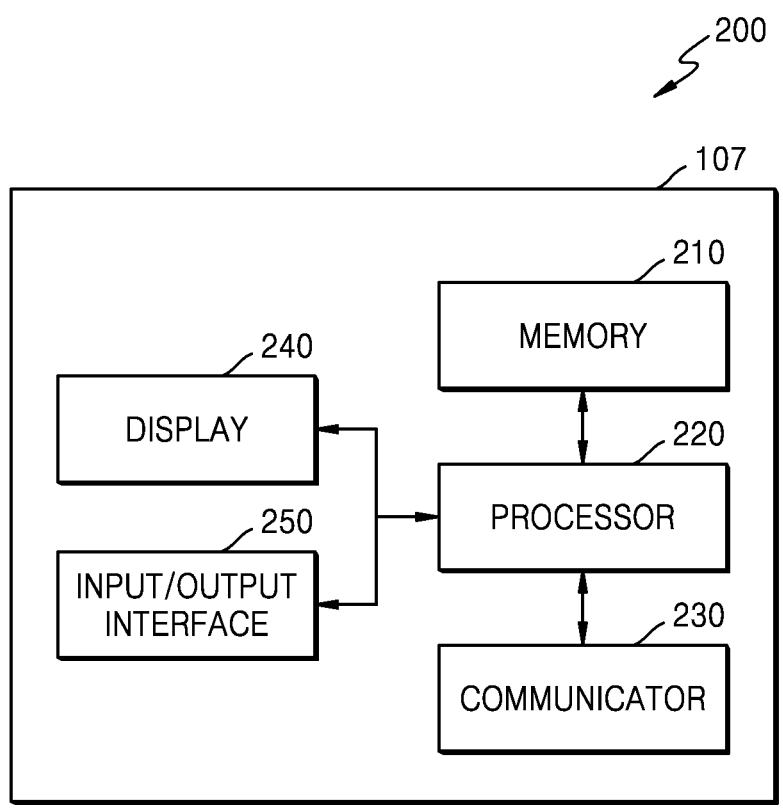
FIG. 2 illustrates a configuration of a terminal in an image display system according to the present disclosure.

FIG. 2 illustrates a configuration 200 of the terminal 107 in the image display system 100 according to the present disclosure. Hereinafter, terms used below, such as ' . . . unit', ' . . . er', or the like, refers to a unit that processes at least one function or operation, and may be implemented as hardware, software, or a combination of hardware and software. The terminal 107 may include a memory 210, a processor 220, a communicator 230, a display 240 and an input/output interface 250.

The memory 210 temporarily or permanently stores data, such as basic programs, application programs, and setting information for an operation of the terminal 107. The memory 210 may include a permanent mass storage device, such as random access memory (RAM), read only memory (ROM), and a disk drive, but is not limited thereto. These software components may be loaded from a recording medium readable by a separate computer from the memory 210 by using a drive mechanism. Such a recording medium readable by a separate computer may include a computer-readable recording medium, such as a floppy drive, a disk, a tape, a DVD/CD-ROM drive, and a memory card. According to the disclosure, software components may be loaded into the memory 210 through the communicator 230 rather than a computer-readable recording medium. Also, the memory 210 may provide stored data according to a request of the processor 220. According to the disclosure, the memory 210 may store an image obtained from the image capturing device 101.

The processor 220 controls overall operations of the terminal 107. For example, the processor 220 may control signals to be transmitted and received through the communicator 230. In addition, the processor 220 may be configured to process commands of a computer program by performing basic arithmetic, logic, and input/output operations. The commands may be provided to the processor 220 by the memory 210 or the communicator 230. For example, the processor 220 may be configured to execute received commands according to program codes stored in a recording device, such as the memory 210. According to the disclosure, the processor 220 may control to display a first UI screen including an image through at least one display, obtain a first user input indicating a pointing position in the image through an input/output interface, generate a first enlarged image related to an area including the pointing position in response to the first user input, and display a second UI screen including the first enlarged image through at least one display. For example, the processor 220 may control the terminal 107 to perform operations according to the disclosure described below.

The communicator 230 performs functions for transmitting and receiving signals through a wireless channel. All or a portion of the communicator 230 may be referred to as a transmitter, a receiver, or a transmitter and receiver. The communicator 230 may provide a function for the terminal 107 and at least one other node to communicate with each other through a communication network. According to the disclosure, when the processor 220 of the terminal 107 generates a request signal according to program code stored in a recording device such as the memory 210, the request signal may be transmitted to at least one other node through a communication network under control by the communicator 230. On the contrary, a control signal, command, content, file, or the like provided and controlled by a processor of at least one other node may be received by the terminal 107 through the communicator 230.

The display 240 indicates a display module including at least one display. Each of one or more displays included in the display 240 may individually display independent content, or the one or more displays described above may be combined to display a single content. According to the disclosure, at least one display included in the display 240 may include multiple displays that are physically separated, multiple displays that are physically combined, or a display capable of dividing and using one screen.

The input/output interface 250 may be a unit for interface with an input/output device. At this time, an input device may be provided in the form of a device, such as a keyboard or mouse, and an output device may be provided in the form of a device, such as a display for displaying an image. As another example, the input/output interface 250 may be a unit for interface with a device in which functions for input and output are integrated into one, such as a touch screen. In particular, the processor 220 of the terminal 107 may display, on a display, a service screen or content configured by using data provided by the server 105 through the input/output interface 250 when processing an instruction of a computer program loaded into the memory 210. According to the disclosure, the input/output interface 250 may include a unit for interface with the display 240. Also, in other embodiments, the terminal 107 may also include more components than those shown in FIG. 2.

According to the disclosure, the terminal 107 may obtain a user input through the input/output interface 250 coupled to the display 240. That is, the display 240 and the input/output interface 250 may be implemented as a touch screen in which a function of obtaining a user input from the user and a function of displaying an image on a screen are integrated into one. In particular, the user may apply at least one of a touch, a tap, and a drag to the touch screen, and in response thereto, the terminal 107 may obtain the user input through the touch screen. According to the disclosure, the terminal 107 may obtain a user input through the input/output interface 250 connected to the outside of the display 240. In particular, the user may apply at least one of a click and a drag to a separate input device, such as a mouse or a keyboard, and in response thereto, the terminal 107 may display a user input result on a display.

Figure 3:
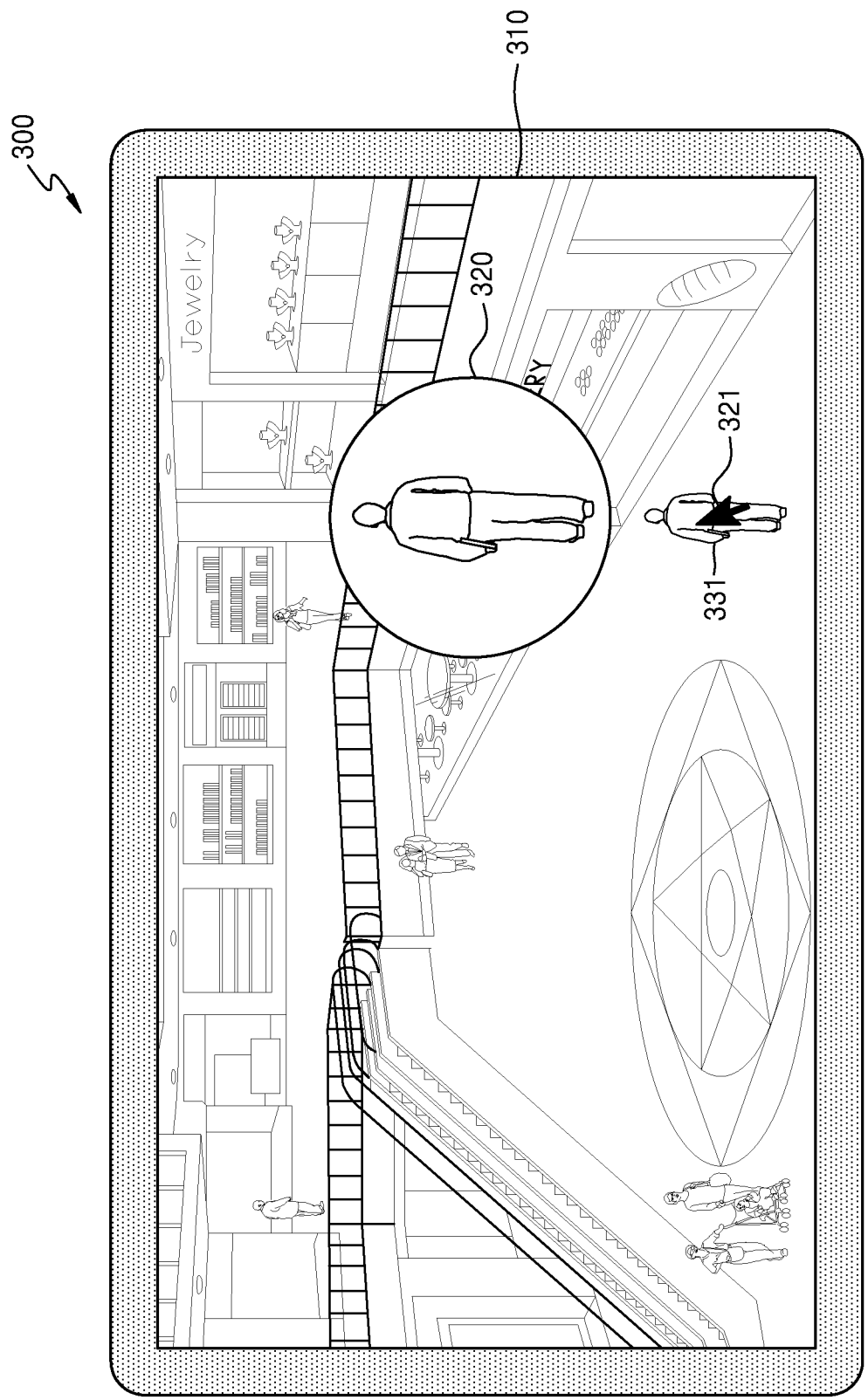
FIG. 3 illustrates an example of a user interface (UI) screen displayed on a terminal in response to a touch input from a user in an image display system according to the present disclosure.

FIG. 3 illustrates a first scene 300 of a UI screen displayed on the terminal 107 in response to a touch input from a user in the image display system 100 according to the present disclosure.

Referring to FIG. 3, the terminal 107 may display a first UI screen including a first scene image 310 by using at least one display. That is, the terminal 107 may display, on a display, the first scene image 310 obtained from the image capturing device 101. The user may input a pointing position to the terminal 107 to check a first object 331 in the first scene image 310, and the terminal 107 may determine the pointing position from the user input. According to the disclosure, when the user inputs data by using an input device, such as a mouse, a first mouse UI object 321 may be displayed on a display screen. That is, the user may determine a pointing position intended by the user in the first scene image 310 by moving the first mouse UI object 321. According to another example, when the user inputs data by using a touch screen, the user may determine a pointing position by directly touching or tapping the pointing position.

The user may input a first user input indicating a pointing position to the terminal 107, and the terminal 107 may generate a first enlarged image 320 in response to the first user input. Here, the first user input may include at least one of a touch input, a click input, and a tap input. Also, the first user input may include an input having an input time greater than a preset threshold time. According to the disclosure, the first user input may include at least one of a long touch, a long click, and a long tap.

When the terminal 107 obtains the first user input, the terminal 107 may generate the first enlarged image 320 obtained by enlarging an area including a pointing position. In particular, the terminal 107 may obtain a second user input for determining an enlargement target area at the pointing position according to the first user input, and generate an enlarged image based on the second user input. Here, the second user input may include at least one of a scrolling input and a sliding touch input. For example, when the user scrolls up a mouse or performs a sliding touch on a touch screen toward the top of an image, the terminal 107 may increase the magnification by reducing the enlargement target area. On the contrary, when the user scrolls down the mouse or performs a sliding touch on the touch screen toward the bottom of the image, the terminal 107 may reduce the magnification by increasing the enlargement target area. That is, the user may select the pointing position through the first user input and determine the degree of magnification through the second user input. The terminal 107 may determine the pointing position based on the first user input and change the enlargement target area according to the second user input. The terminal 107 may generate the first enlarged image 320 by enlarging an image of the determined enlargement target area as large as an enlarged image having a preset size.

Alternatively, when the terminal 107 obtains the first user input, the terminal 107 may transmit an image request message including information about an image and information about a pointing position to the server 105. The server 105 may receive the image request message and transmit a server image corresponding to the information about the image and the information about the pointing position to the terminal 107. The server 105 may store a first image and a second image, and the first image and the second image may be images obtained by capturing the same scene by the image capturing device 101. The first image and the second image may have different resolutions. For example, the resolution of the first image may be less than or equal to the resolution of the second image. When the first image is high-definition (HD) resolution, the second image may be ultra high definition (UHD) resolution. That is, the server 105 may store data with different resolutions for the same scene. Also, the server 105 may transmit an image to the terminal 107. The first image stored in the server 105 may correspond to the first scene image 310 in the terminal 107, and the second image stored in the server 105 may correspond to a server image and the first enlarged image 320 in the terminal 107. The server 105 may generate the first enlarged image 320 from the second image stored in the server 105 by checking the information about the image and the information about the pointing position, and identifying an enlargement target area. The server 105 may transmit the generated first enlarged image 320 to the terminal 107. Also, the server 105 may check the information about the image and the information about the pointing position and identify the enlargement target area to generate a server image from the second image stored in the server 105 to transmit the generated server image to the terminal 107. The terminal 107 may determine a pointing position and change the enlargement target area according to the second user input. The terminal 107 may generate the first enlarged image 320 by enlarging a server image of the determined enlargement target area as large as an enlarged image having a preset size. This is to effectively perform a zoom function by increasing the resolution of the first enlarged image 320 in the terminal 107.

Thereafter, the terminal 107 may display a second UI screen including the first enlarged image 320 by using at least one display. According to the disclosure, the terminal 107 may display the generated first enlarged image 320 above and near the pointing position. Accordingly, the first enlarged image 320 may be displayed as an overlay above and near the pointing position in the first scene image 310.

Figure 4:
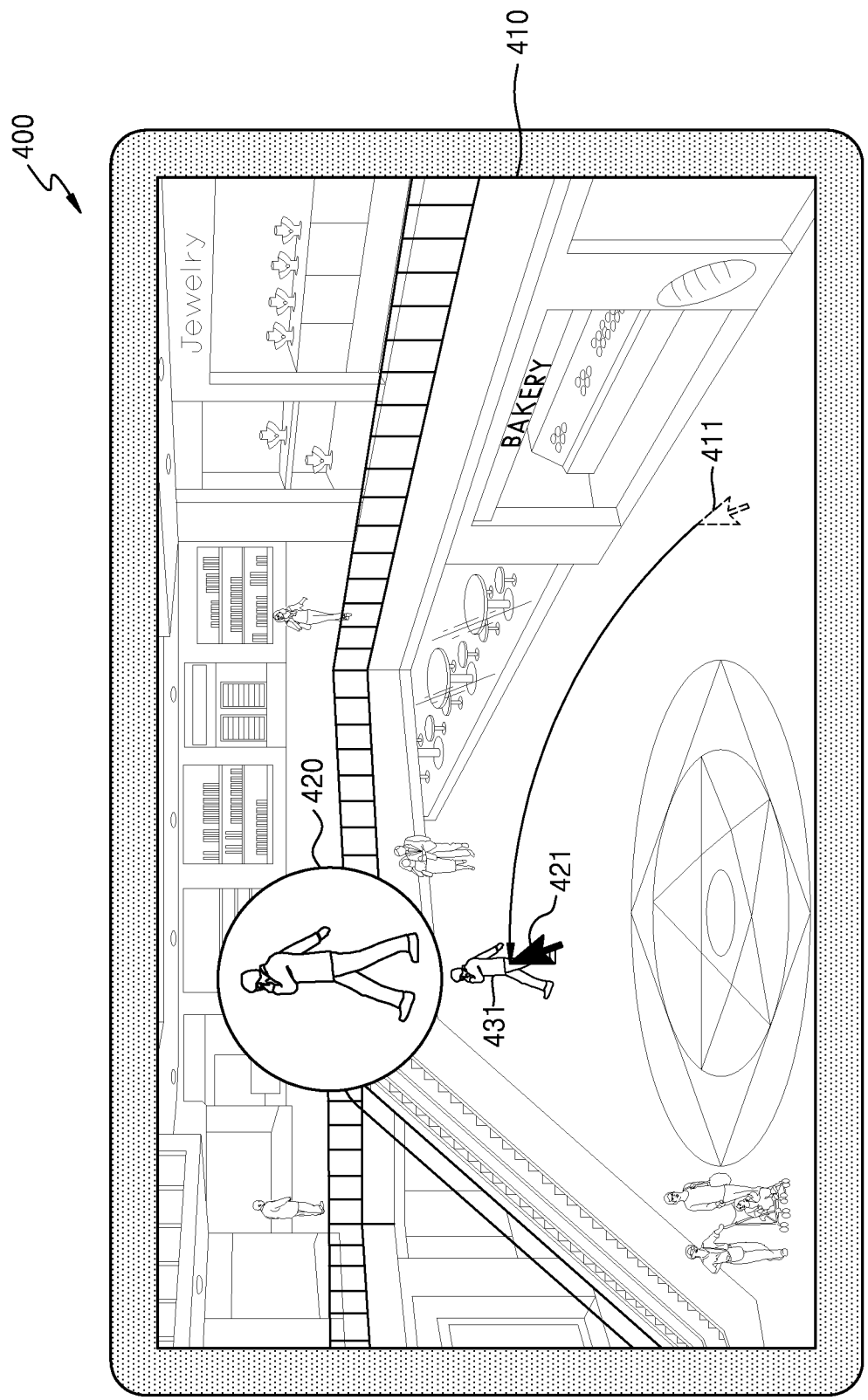
FIG. 4 illustrates an example of a UI screen displayed on a terminal in response to a drag input from a user in an image display system according to the present disclosure.

FIG. 4 illustrates a second scene 400 of a UI screen displayed on the terminal 107 in response to a drag input from the user in the image display system 100 according to the present disclosure.

Referring to FIG. 4, the terminal 107 may display a first UI screen including a second scene image 410 by using at least one display. The user may input a pointing position to the terminal 107 to check a second object 431 in the second scene image 410. Here, the second object 431 may be a moving object, and the user may continuously change the pointing position to check the second object 431, which is moving. According to the disclosure, the user may track the second object 431 in the second scene image 410 by moving a mouse UI object.

The user may input a third user input indicating a change of pointing position to the terminal 107, and the terminal 107 may generate a second enlarged image 420 related to a pointing position being changed in response to the third user input. Here, the third user input may include a drag input consecutive to the first user input. That is, the user may input at least one of a long touch, a long click, and a long tap in a situation where the mouse UI object is arranged at a first position 411, and may subsequently add a drag input to control the mouse UI object to move to a second position 421.

When the terminal 107 obtains the third user input, the terminal 107 may generate the second enlarged image 420 obtained by enlarging an area including the pointing position being changed. That is, a displayed position of the second enlarged image 420 on the second scene image 410 may be changed according to the drag input. The terminal 107 may generate the second enlarged image 420 by determining the pointing position being changed based on the third user input and enlarging an image of an area including the pointing position being changed by an amount of an enlarged image of a preset size.

Alternatively, when the terminal 107 obtains the first user input, the terminal 107 may transmit an image request message including information about an image and information about a pointing position to the server 105. The server 105 may receive the image request message and transmit a server image corresponding to the information about the image and the information about the pointing position to the terminal 107. The server 105 may store a first image and a second image, and the first image and the second image may be images obtained by capturing the same scene by the image capturing device 101. The first image and the second image may have different resolutions. For example, the resolution of the first image may be less than or equal to the resolution of the second image. When the first image is HD resolution, the second image may be UHD resolution. That is, the server 105 may store data with different resolutions for the same scene. Also, the server 105 may transmit an image to the terminal 107. The first image stored in the server 105 may correspond to the second scene image 410 in the terminal 107, and the second image stored in the server 105 may correspond to a server image and the second enlarged image 420 in the terminal 107. The server 105 may generate the second enlarged image 420 from the second image stored in the server 105 by checking the information about the image and the information about the pointing position, and identifying an enlargement target area. The server 105 may transmit the generated second enlarged image 420 to the terminal 107. Also, the server 105 may check the information about the image and the information about the pointing position and identify the enlargement target area to generate a server image from the second image stored in the server 105 to transmit the generated server image to the terminal 107. The terminal 107 may determine a pointing position and change the enlargement target area according to the second user input. The terminal 107 may generate the second enlarged image 420 by enlarging a server image of the determined enlargement target area by an amount of an enlarge image having a preset size. This is to effectively perform a zoom function by increasing the resolution of the second enlarged image 420 in the terminal 107.

Thereafter, the terminal 107 may display a third UI screen including the second enlarged image 420 by using at least one display. According to the disclosure, the terminal 107 may display the generated second enlarged image 420 above and near the pointing position. Accordingly, the second enlarged image 420 may be displayed as an overlay above and near the pointing position being changed.

Figure 5:
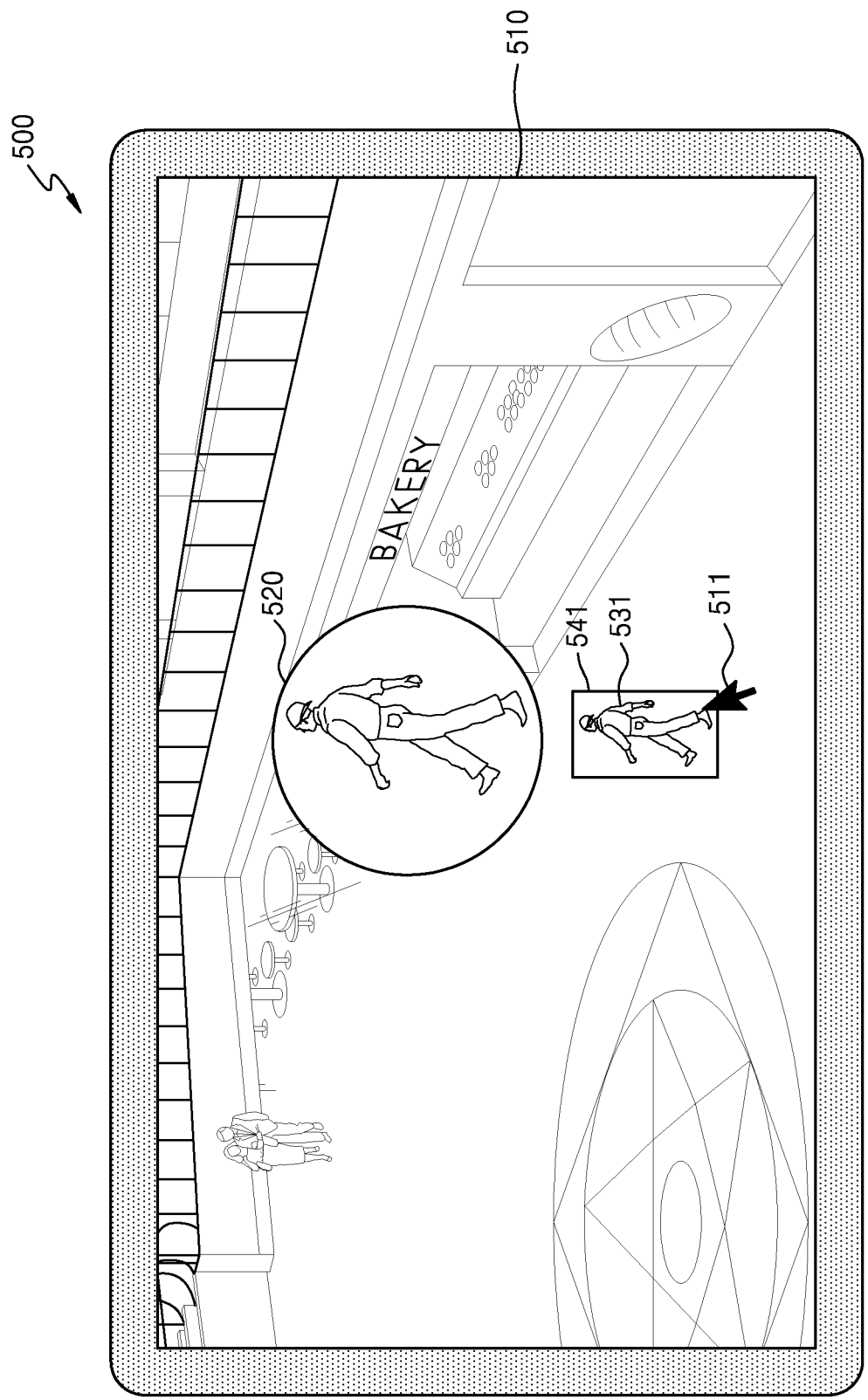
FIG. 5 illustrates an example of displaying a UI screen on a terminal by using object recognition in an image display system according to the present disclosure.

FIG. 5 illustrates a third scene 500 of displaying a UI screen on the terminal 107 by using object recognition in the image display system 100 according to the present disclosure.

Referring to FIG. 5, the terminal 107 may display a first UI screen including a third scene image 510 by using at least one display. That is, the terminal 107 may display, on a display, the third scene image 510 obtained from the image capturing device 101. The user may input a pointing position to the terminal 107 to check a third object 531 in the third scene image 510. Also, the terminal 107 or the server 105 may recognize the third object 531 in the third scene image 510. When the server 105 recognizes the third object 531 in the third scene image 510 through object recognition, the server 105 may transmit information about the third object 531 of the third scene image 510 to the terminal 107. For example, the terminal 107 or the server 105 may generate a bounding box 541 including the information of the third object 531 through object recognition.

The terminal 107 or the server 105 may compare a distance between a position of the third object 531 recognized in the third scene image 510 and a pointing position, and may match the third object 531 with the pointing position when the distance is less than or equal to a threshold value. For example, the terminal 107 or the server 105 may compare a distance between the bounding box 541 in the third scene image 510 and the pointing position, and match the third object 531 with the pointing position when the distance is less than or equal to a threshold value.

When the user inputs data by using an input device, such as a mouse, a second mouse UI object 511 may be displayed on a display screen. That is, the user may determine a pointing position intended by the user in the third scene image 510 by moving the second mouse UI object 511. According to another example, when the user inputs data by using a touch screen, the user may determine a pointing position by directly touching or tapping the pointing position.

The user may input a first user input indicating a pointing position to the terminal 107, and the terminal 107 may generate a third enlarged image 520 in response to the first user input. Here, the first user input may include at least one of a touch input, a click input, and a tap input. Also, the first user input may include an input having an input time greater than a preset threshold time. According to the disclosure, the first user input may include at least one of a long touch, a long click, and a long tap.

When the terminal 107 obtains the first user input, the terminal 107 may generate the third enlarged image 520 obtained by enlarging an area including a pointing position. In particular, the terminal 107 may obtain a second user input for determining an enlargement target area at the pointing position according to the first user input, and generate an enlarged image based on the second user input. Here, the second user input may include at least one of a scrolling input and a sliding touch input. For example, when the user scrolls up a mouse or performs a sliding touch on a touch screen toward the top of an image, the terminal 107 may increase the magnification by reducing the enlargement target area. On the contrary, when the user scrolls down the mouse or performs a sliding touch on the touch screen toward the bottom of the image, the terminal 107 may reduce the magnification by increasing the enlargement target area. That is, the user may select the pointing position through the first user input and determine the degree of magnification through the second user input. The terminal 107 may determine the pointing position based on the first user input and change the enlargement target area according to the second user input. The terminal 107 may generate the third enlarged image 520 by enlarging an image of the determined enlargement target area by an amount of an enlarged image having a preset size.

Alternatively, when the terminal 107 obtains the first user input, the terminal 107 may transmit an image request message including information about an image and information about a pointing position to the server 105. The server 105 may receive the image request message and transmit a server image corresponding to the information about the image and the information about the pointing position to the terminal 107. The server 105 may store a first image and a second image, and the first image and the second image may be images obtained by capturing the same scene by the image capturing device 101. The first image and the second image may have different resolutions. For example, the resolution of the first image may be less than or equal to the resolution of the second image. When the first image is HD resolution, the second image may be UHD resolution. That is, the server 105 may store data with different resolutions for the same scene. Also, the server 105 may transmit an image to the terminal 107. The first image stored in the server 105 may correspond to the third scene image 510 in the terminal 107, and the second image stored in the server 105 may correspond to a server image and the third enlarged image 520 in the terminal 107. The server 105 may generate the third enlarged image 520 from the second image stored in the server 105 by checking information about the image and the information about the pointing position, and identifying an enlargement target area. The server 105 may transmit the generated third enlarged image 520 to the terminal 107. Also, the server 105 may check the information about the image and the information about the pointing position and identify the enlargement target area to generate a server image from the second image stored in the server 105 to transmit the generated server image to the terminal 107. The terminal 107 may determine a pointing position and change the enlargement target area according to the second user input. The terminal 107 may generate the third enlarged image 520 by enlarging a server image of the determined enlargement target area by an amount of an enlarged image having a preset size. This is to effectively perform a zoom function by increasing the resolution of the third enlarged image 520 in the terminal 107.

Thereafter, the terminal 107 may display a second UI screen including the third enlarged image 520 by using at least one display. According to the disclosure, the terminal 107 may display the generated third enlarged image 520 above and near the pointing position. Accordingly, the third enlarged image 520 may be displayed as an overlay on the top of the position of the object 531 or on the top of the position of the bounding box 541 in the third scene image 510.

Figure 6:
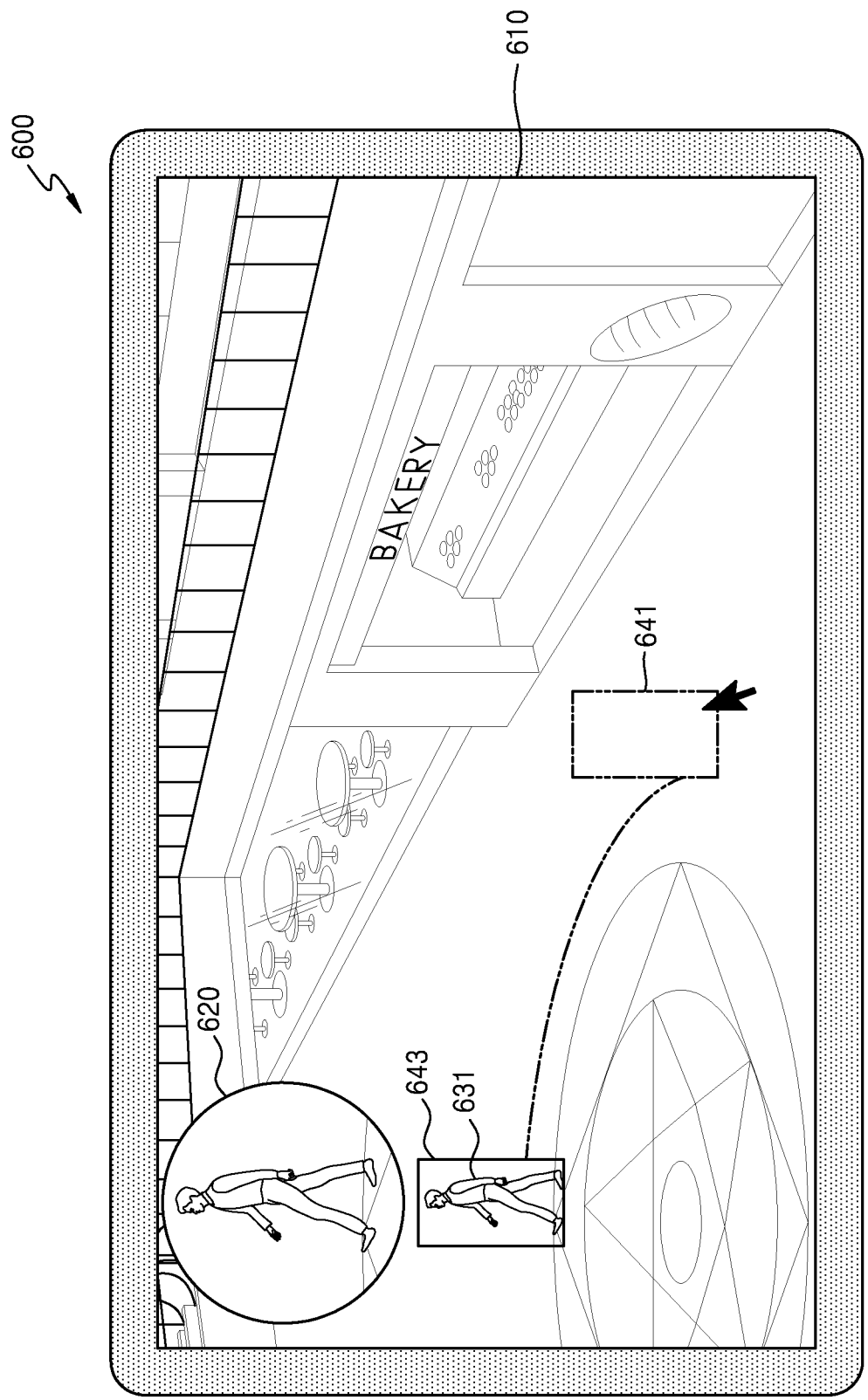
FIG. 6 illustrates another example of displaying a UI screen on a terminal by using object recognition in an image display system according to the present disclosure.

FIG. 6 illustrates a fourth scene 600 of displaying a UI screen on the terminal 107 by using object recognition in the image display system 100 according to the present disclosure.

Referring to FIG. 6, the terminal 107 may display a first UI screen including a fourth scene image 610 by using at least one display. Here, a fourth object 631 may be a moving object, and the terminal 107 or the server 105 may check the position of the fourth object 631, which is moving, by using object recognition.

The terminal 107 or the server 105 may recognize a position change of the fourth object 631 in the fourth scene image 610. When the server 105 recognizes the fourth object 631 in the fourth scene image 610 through object recognition, the server 105 may transmit information about the fourth object 631 of the fourth scene image 610 to the terminal 107. For example, the terminal 107 or the server 105 may generate a first bounding box 641 including the information of the fourth object 631 through object recognition. The terminal 107 or the server 105 may determine the first bounding box 641 of the fourth object 631 through object recognition and determine a second bounding box 643, which is changed according to the movement of the fourth object 631, to identify the position of the fourth object 631, which is changed.

The terminal 107 or the server 105 may generate a fourth enlarged image 620 related to an area including a pointing position being changed in correspondence with the position of the fourth object 631, which is being changed according to object recognition. That is, a displayed position of the fourth enlarged image 620 on the fourth scene image 610 may be changed according to the position change of the fourth object 631. The terminal 107 may generate the fourth enlarged image 620 by determining the pointing position being changed based on a third user input and enlarging an image of an area including the pointing position being changed by an amount of an enlarged image of a preset size.

Alternatively, when the terminal 107 obtains the first user input, the terminal 107 may transmit an image request message including information about an image and information about a pointing position to the server 105. The server 105 may receive the image request message and transmit a server image corresponding to the information about the image and the information about the pointing position to the terminal 107. The server 105 may store a first image and a second image, and the first image and the second image may be images obtained by capturing the same scene by the image capturing device 101. The first image and the second image may have different resolutions. For example, the resolution of the first image may be less than or equal to the resolution of the second image. When the first image is HD resolution, the second image may be UHD resolution. That is, the server 105 may store data with different resolutions for the same scene. Also, the server 105 may transmit an image to the terminal 107. The first image stored in the server 105 may correspond to the fourth scene image 610 in the terminal 107, and the second image stored in the server 105 may correspond to a server image and the fourth enlarged image 620 in the terminal 107. The server 105 may generate the fourth enlarged image 620 from the second image stored in the server 105 by checking the information about the image and the information about the pointing position, and identifying an enlargement target area. The server 105 may transmit the generated fourth enlarged image 620 to the terminal 107. Also, the server 105 may check the information about the image and the information about the pointing position and identify the enlargement target area to generate a server image from the second image stored in the server 105 to transmit the generated server image to the terminal 107. The terminal 107 may determine a pointing position and change the enlargement target area according to the second user input. The terminal 107 may generate the fourth enlarged image 620 by enlarging a server image of the determined enlargement target area by an amount of an enlarge image having a preset size. This is to effectively perform a zoom function by increasing the resolution of the fourth enlarged image 620 in the terminal 107.

Thereafter, the terminal 107 may display a third UI screen including the fourth enlarged image 620 by using at least one display. According to the disclosure, the terminal 107 may display the generated fourth enlarged image 620 above and near the pointing position. Accordingly, the fourth enlarged image 620 may be displayed as an overlay on the top of the position of the fourth object 631 or on the top of the position of the first bounding box 641 in the fourth scene image 610.

Figure 7:
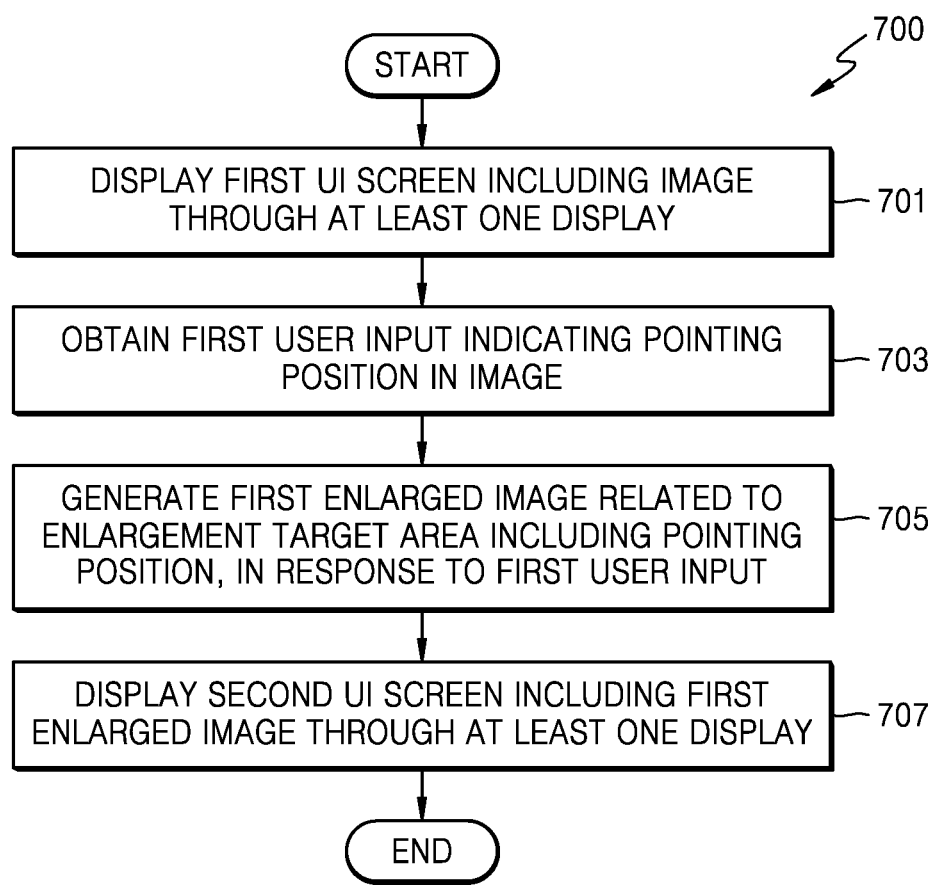
FIG. 7 is a flowchart illustrating a method of displaying, by a terminal, a UI screen including an enlarged image in response to a touch input from a user in an image display system according to the present disclosure.

FIG. 7 is a flowchart 700 illustrating a method of displaying, by the terminal 107, a UI screen including an enlarged image in response to a touch input from a user in the image display system 100 according to the present disclosure. FIG. 7 illustrates a method of operating the terminal 107 that displays an image obtained from an image capturing device.

Referring to FIG. 7, in operation 701, the terminal 107 displays a first UI screen including an image through at least one display. According to the disclosure, the terminal 107 may display an image obtained from an image capturing device on at least one display to provide the image to the user.

In operation 703, the terminal 107 obtains a first user input indicating a pointing position in the image. The terminal 107 may obtain information about a position intended by the user in an image. According to the disclosure, the first user input may include at least one of a touch input, a click input, and a tap input, and an input time of the first user input may be greater than or equal to a preset threshold time. That is, the terminal 107 may receive at least one of a long touch, a long click, and a long tap from the user.

In operation 705, the terminal 107 generates a first enlarged image related to an enlargement target area including a pointing position in response to the first user input. The terminal 107 may generate an enlarged image related to a pointing position determined according to the first user input. According to the disclosure, the terminal 107 may obtain a second user input for determining an enlargement target area and generate an enlarged image based on the second user input. According to the disclosure, the second user input may include at least one of a scrolling input and a sliding touch input. That is, the terminal 107 may reduce the enlargement target area in response to scrolling up of a mouse or a sliding touch on a touch screen toward the top of an image by the user, and may increase the enlargement target area in response to an opposite input. Thereafter, the terminal 107 may generate a first enlarged image by enlarging an image of the enlargement target area by an amount of an enlarged image having a preset size.

In operation 707, the terminal 107 may display a second UI screen including the first enlarged image through at least one display. The terminal 107 may display the first enlarged image and an image obtained from the image capturing device. According to the disclosure, the terminal 107 may display the first enlarged image as an overlay above and near a pointing position in the image.

Figure 8:
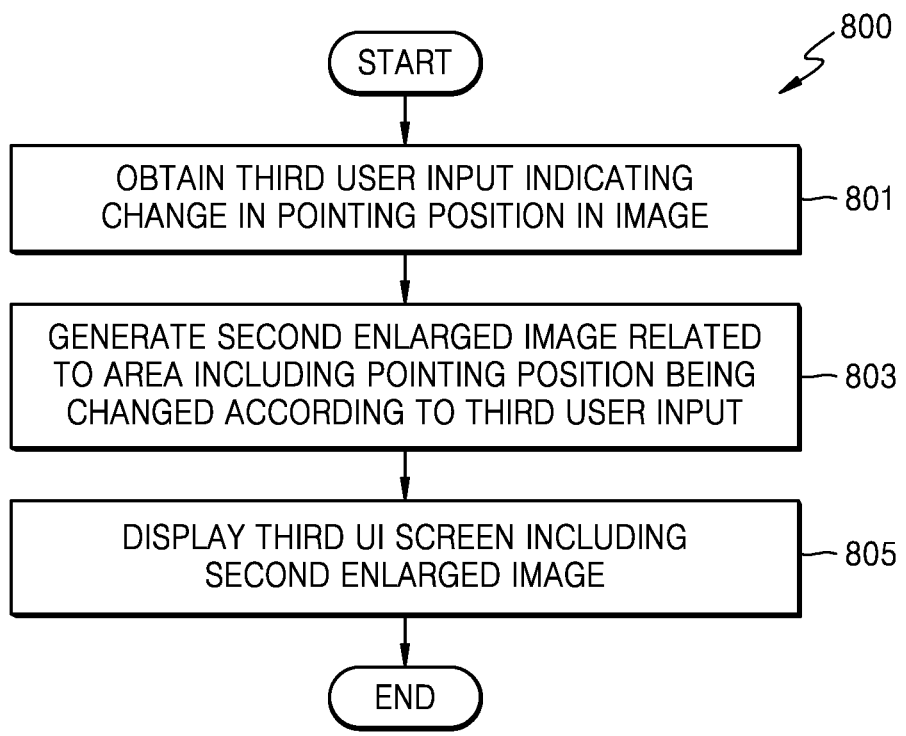
FIG. 8 is a flowchart illustrating a method of displaying, by a terminal, a UI screen including an enlarged image in response to a drag input from a user in an image display system according to the present disclosure.

FIG. 8 is a flowchart 800 illustrating a method of displaying, by the terminal 107, a UI screen including an enlarged image in response to a drag input from a user in the image display system 100 according to the present disclosure.

In operation 801, the terminal 107 obtains a third user input indicating a change of pointing position in an image. When the user changes the pointing position, the terminal 107 may change an enlargement target area in response to the change of pointing position. According to the disclosure, the third user input may include a drag input consecutive to the first user input.

In operation 803, the terminal 107 generates a second enlarged image related to an area including the pointing position being changed according to the third user input. According to the disclosure, when the pointing position is changed according to a drag input of the user, the terminal 107 may determine the pointing position being changed and generate an enlarged image related to the pointing position being changed.

In operation 805, the terminal 107 displays a third UI screen including the second enlarged image. The terminal 107 may display a UI screen in which the position of the second enlarged image is changed according to the drag input. According to the disclosure, the terminal 107 may display the second enlarged image as an overlay above and near the pointing position being changed based on the third user input.

Figure 9:
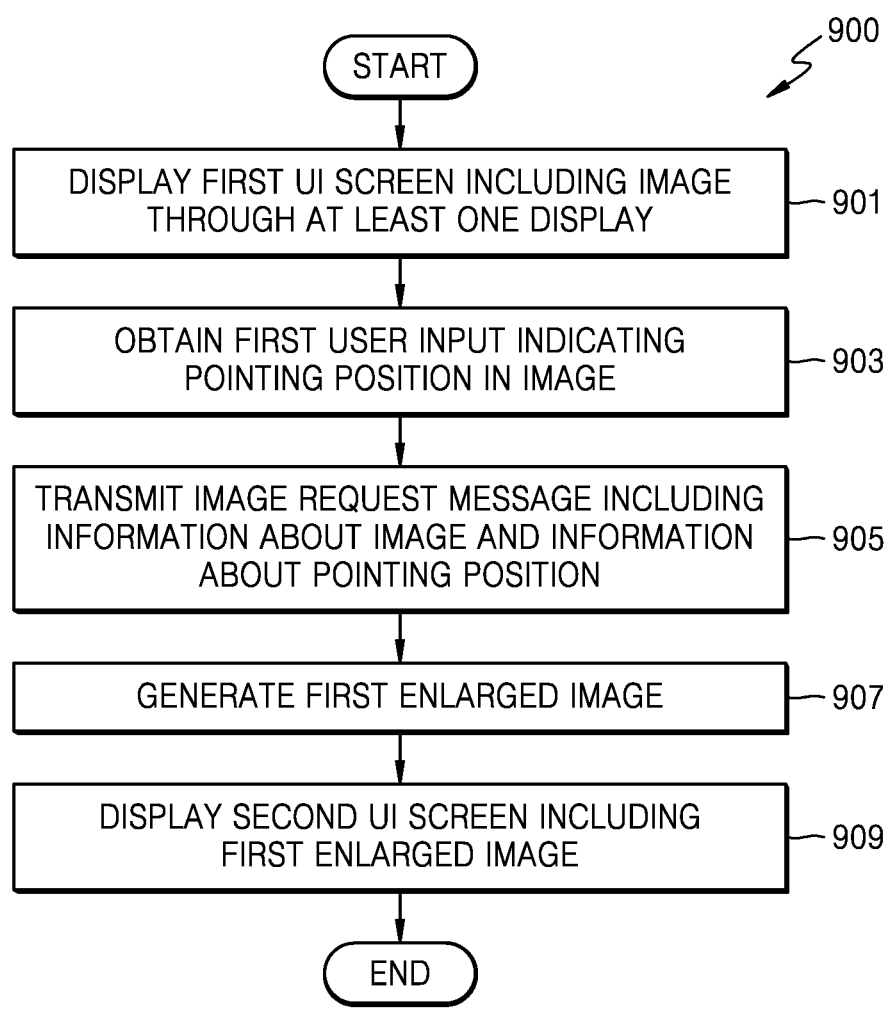
FIG. 9 is a flowchart illustrating a method of displaying, on a terminal, a server image received from a server in an image display system according to the present disclosure.

FIG. 9 is a flowchart illustrating a method of displaying, on the terminal 107, a server image received from the server 105 in the image display system 100 according to the present disclosure. FIG. 9 illustrates a method of operating the terminal 107 that displays an image obtained from the image capturing device 101 or the server 105.

Referring to FIG. 9, in operation 901, the terminal 107 displays a first UI screen including an image through at least one display. According to the disclosure, the terminal 107 may display an image obtained from an image capturing device on at least one display to provide the image to the user.

In operation 903, the terminal 107 obtains a first user input indicating a pointing position in the image. The terminal 107 may obtain information about a position intended by the user in an image. According to the disclosure, the first user input may include at least one of a touch input, a click input, and a tap input, and an input time of the first user input may be greater than or equal to a preset threshold time. That is, the terminal 107 may receive at least one of a long touch, a long click, and a long tap from the user.

In operation 905, when the terminal 107 obtains the first user input, the terminal 107 may transmit an image request message including information about an image and information about a pointing position to the server 105. The server 105 may receive the image request message and transmit a server image corresponding to the information about the image and the information about the pointing position to the terminal 107. The server 105 may store a first image and a second image, and the first image and the second image may be images obtained by capturing the same scene by the image capturing device 101. The first image and the second image may have different resolutions. For example, the resolution of the first image may be less than or equal to the resolution of the second image. When the first image is HD resolution, the second image may be UHD resolution. That is, the server 105 may store data with different resolutions for the same scene. Also, the server 105 may transmit an image to the terminal 107. The first image stored in the server 105 may correspond to an image in the terminal 107, and the second image stored in the server 105 may correspond to a server image and a first enlarged image in the terminal 107. The server 105 may generate the first enlarged image from the second image stored in the server 105 by checking information about the image and information about the pointing position, and identifying an enlargement target area. The server 105 may transmit the generated first enlarged image to the terminal 107. Alternatively, the server 105 may check the information about the image and information about the pointing position and identify the enlargement target area to generate a server image from the second image stored in the server 105 to transmit the generated server image to the terminal 107.

In operation 907, the terminal 107 generates a first enlarged image related to an enlargement target area including a pointing position in response to the first user input. The terminal 107 may generate an enlarged image of the pointing position determined according to the first user input by using the server imaged received from the server 105. According to the disclosure, the terminal 107 may obtain a second user input for determining an enlargement target area, and may generate an enlarged image from a server image received from the server 105 based on the second user input. According to the disclosure, the second user input may include at least one of a scrolling input and a sliding touch input. That is, the terminal 107 may reduce the enlargement target area in response to scrolling up of a mouse or a sliding touch on a touch screen toward the top of an image by the user, and may increase the enlargement target area in response to an opposite input. Thereafter, the terminal 107 may generate a first enlarged image by enlarging an image of the enlargement target area by an amount of an enlarged image having a preset size.

In operation 909, the terminal 107 displays a second UI screen including the first enlarged image through at least one display. The terminal 107 may display the first enlarged image and an image obtained from the image capturing device. According to the disclosure, the terminal 107 may display the first enlarged image as an overlay above and near a pointing position in the image.

Figure 10:
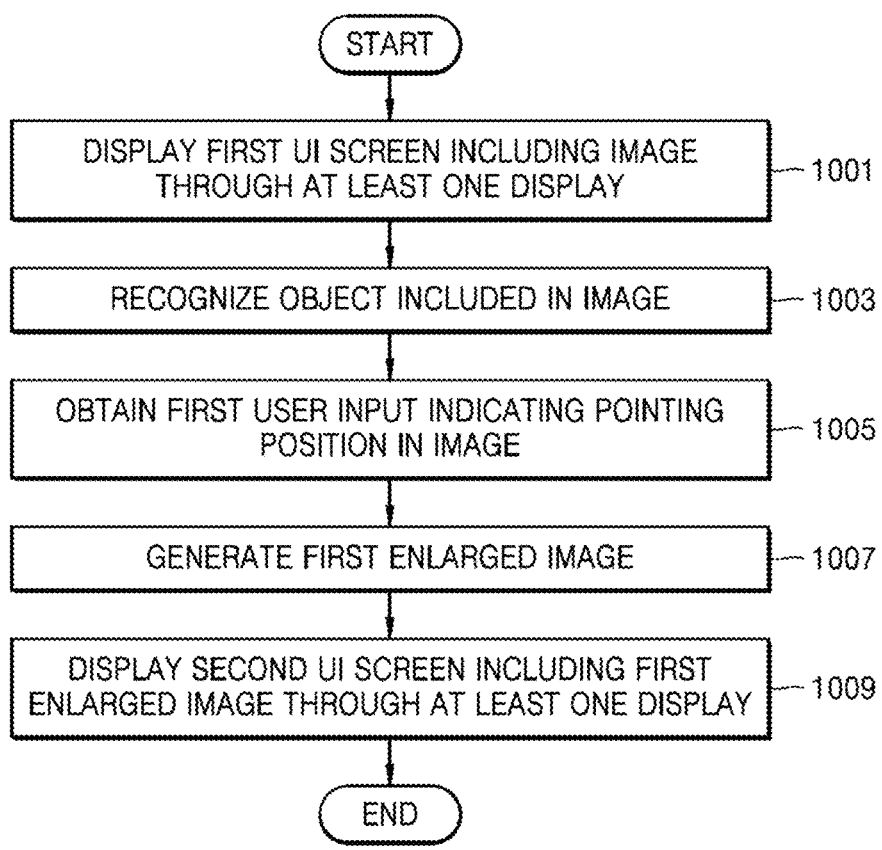
FIG. 10 is a flowchart illustrating a method of displaying, on a terminal, an image by using object recognition in an image display system according to the present disclosure.

FIG. 10 is a flowchart illustrating a method of displaying, on the terminal 107, an image by using object recognition in the image display system 100 according to the present disclosure.

Referring to FIG. 10, in operation 1001, the terminal 107 displays a first UI screen including an image through at least one display. According to the disclosure, the terminal 107 may display an image obtained from an image capturing device on at least one display to provide the image to the user.

In operation 1003, the terminal 107 may perform object recognition on an object included in the image. The terminal 107 may generate a bounding box including information of the object through object recognition.

In operation 1005, the terminal 107 may obtain a first user input that indicates a pointing position in the image. The terminal 107 may obtain information about a position intended by the user in an image. According to the disclosure, the first user input may include at least one of a touch input, a click input, and a tap input, and an input time of the first user input may be greater than or equal to a predetermined threshold time. That is, the terminal 107 may receive at least one of a long touch, a long click, and a long tap from the user. In operation 1005, the terminal 107 may compare a distance between the position of the recognized object and the pointing position in the image, and may match the object with the pointing position when the distance is less than or equal to a threshold value. For example, the terminal 107 may compare a distance between the positions of a bounding box and a pointing position in the image, and may match the object with the pointing position when the distance is less than or equal to a threshold value. This matching may be maintained even when the object moves.

In operation 1007, the terminal 107 generates a first enlarged image related to an enlargement target area including a pointing position in response to the first user input. The terminal 107 may generate an enlarged image related to a pointing position determined according to the first user input. According to the disclosure, the terminal 107 may obtain a second user input for determining an enlargement target area and generate an enlarged image based on the second user input. According to the disclosure, the second user input may include at least one of a scrolling input and a sliding touch input. That is, the terminal 107 may reduce the enlargement target area in response to scrolling up of a mouse or a sliding touch on a touch screen toward the top of an image by the user, and may increase the enlargement target area in response to an opposite input. Thereafter, the terminal 107 may generate a first enlarged image by enlarging an image of the enlargement target area by an amount of an enlarged image having a preset size.

In operation 1009, the terminal 107 displays a second UI screen including the first enlarged image through at least one display. The terminal 107 may display the first enlarged image and an image obtained from the image capturing device. According to the disclosure, the terminal 107 may display the first enlarged image above and near the pointing position. Accordingly, the first enlarged image may be displayed as an overlay on the top of a pointing position or on the top of the position of a bounding box in the image.

In operation 1007 according to another example, the terminal 107 may recognize a position change of an object within the image. The terminal 107 may generate a first bounding box including information of the object through object recognition. The terminal 107 may determine the first bounding box of the object through object recognition, and determine a second bounding box changed according to the movement of the object to identify the position of the object, which is changing. The terminal 107 may generate a second enlarged image of an area including a pointing position being changed in correspondence to the position of the object, which is changed according to object recognition. That is, a displayed position of the second enlarged image on the image may be changed according to the position change of the object. The terminal 107 may generate the second enlarged image by determining the pointing position being changed based on a third user input and enlarging an image of an area including the pointing position being changed by an amount of an enlarged image of a preset size.

In operation 1007 according to another example, when the terminal 107 obtains the first user input, the terminal may also transmit an image request message including information about an image and information about a pointing position to the server 105. The server 105 may receive the image request message and transmit a server image corresponding to the information about the image and information about the pointing position to the terminal 107. The server 105 may store a first image and a second image, and the first image and the second image may be images obtained by capturing the same scene by the image capturing device 101. The first image and the second image may have different resolutions. For example, the resolution of the first image may be less than or equal to the resolution of the second image. When the first image is HD resolution, the second image may be UHD resolution. That is, the server 105 may store data with different resolutions for the same scene. Also, the server 105 may transmit an image to the terminal 107. The first image stored in the server 105 may correspond to an image in the terminal 107, and the second image stored in the server 105 may correspond to a server image and a first enlarged image in the terminal 107. The server 105 may generate the first enlarged image from the second image stored in the server 105 by checking information about the image and information about the pointing position, and identifying an enlargement target area. The server 105 may transmit the generated first enlarged image to the terminal 107. Alternatively, the server 105 may check the information about the image and information about the pointing position and identify the enlargement target area to generate a server image from the second image stored in the server 105 to transmit the generated server image to the terminal 107.

Figure 11:
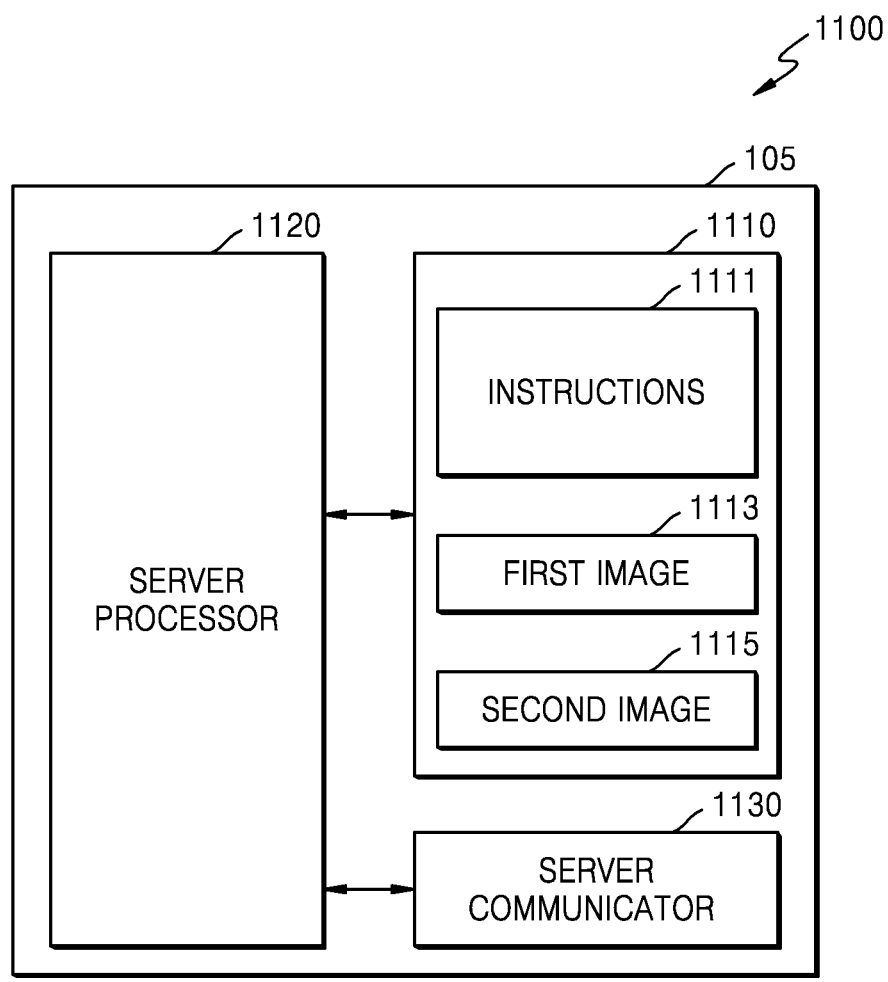
FIG. 11 illustrates a configuration of a server in an image display system according to the present disclosure.

FIG. 11 illustrates a configuration 1100 of the server 105 in an image display system according to the present disclosure. Hereinafter, terms used below, such as ' . . . unit', ' . . . er', or the like, refers to a unit that processes at least one function or operation, and may be implemented as hardware, software, or a combination of hardware and software.

The server 105 may include a memory 1110, a server processor 1120, and a server communicator 1130.

The memory 1110 temporarily or permanently stores data, such as basic programs, application programs, and setting information for an operation of the server 105. The memory 1110 may include a permanent mass storage device, such as RAM, ROM, and a disk drive, but is not limited thereto. These software components may be loaded from a recording medium readable by a separate computer from the memory 1110 by using a drive mechanism. Such a recording medium readable by a separate computer may include a computer-readable recording medium, such as a floppy drive, a disk, a tape, a DVD/CD-ROM drive, and a memory card.

The memory 1110 may store computer executable instructions 1111. The server 105 is an example of a computer capable of executing computer-executable instructions.

The memory 1110 may include instructions for displaying a first UI screen including an image obtained from an image capturing device, instructions for obtaining a first user input indicating a pointing position in an image, instructions for generating a first enlarged image related to an enlargement target area corresponding to a pointing position in response to the first user input, and instructions for displaying a second UI screen including the first enlarged image through a display.

The memory 1110 may store instructions for transmitting an image request message including information about an image and information about a pointing position to a server, instructions for receiving, from the server, a server image corresponding to the information about the image included in the image request message and information about the pointing position, and instructions for generating a first enlarged image based on the server image.

In addition, the memory 1110 may include instructions for recognizing an object by using an image and instructions for generating a first enlarged image when a distance between the position of a recognized object and a pointing position is less than or equal to a threshold value and an input time of a first user input is greater than or equal to a preset threshold time.

The memory 1110 may store images of images captured from the image capturing device 101 of the same scene in different resolutions. For example, the memory 1110 may store a first image 1113 and a second image 1115. At this time, the resolution of the first image 1113 may be less than or equal to the resolution of the second image 1115.

The first image 1113 may correspond to an image in the terminal 107. The second image 1115 may correspond to an enlarged image of the terminal 107 or a server image.

The server communicator 1130 performs functions for transmitting and receiving signals through a wireless channel. All or a portion of the server communicator 1130 may be referred to as a transmitter, a receiver, or a transmitter and receiver. The server communicator 1130 may provide a function for the server 105 and at least one other node to communicate with each other through a communication network. The server communicator 1130 may receive a server image request message from the terminal 107 and transmit a server image or a first enlarged image to the terminal 107.

The method of operating the server 105 described above may be implemented in the form of a computer-readable storage medium storing instructions or data executable by a computer or the server processor 1120. The method of operating the server 105 described above may be written as a program that may be executed on a computer, and may be implemented in a general-purpose digital computer that operates such a program using a computer-readable storage medium. Such a computer-readable storage medium may include ROM, RAM, flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device that may store instructions or software, related data, data files, and data structures, and may provide the instructions or software, related data, data files, and data structures to a processor or computer so that the processor or computer may execute the instructions.

Methods according to the present disclosure described in the claims or the disclosure may be implemented in the form of hardware, software, or a combination of hardware and software.

When the methods are implemented in software, a computer readable storage medium storing one or more programs (software modules) may be provided. One or more programs stored in a computer-readable storage medium are configured for execution by one or more processors in an electronic device. The one or more programs include instructions that cause the electronic device to execute methods according to the examples described in the claims or the disclosure.

Such programs (software modules, software) may be stored in RAM, non-volatile memory including flash memory, ROM, electrically erasable programmable read only memory (EEPROM), magnetic disc storage devices, compact disc-ROM (CD-ROM), digital versatile discs (DVDs), or other forms of optical storage devices, and magnetic cassettes. Alternatively, the programs may be stored in a memory configured by a combination of some or all of those described above. In addition, each of memories configured above may be provided in plurality.

Also, the programs may be stored in an attachable storage device that may be accessed through communication network such as the Internet, intranet, local area network (LAN), wide area network (WAN), or storage area network (SAN), or a communication network configured by a combination thereof. Such a storage device may be connected to a device performing an example of the disclosure through an external port. In addition, a separate storage device on a communication network may be connected to a device performing an example of the disclosure.

In the disclosure described above, components included in the disclosure are expressed in singular or plural numbers according to the disclosure. However, the singular or plural expressions are selected appropriately for the presented situation for convenience of explanation, and the disclosure is not limited to singular or plural components, and components expressed in a plurality may consist of a singular number, or components expressed in a singular number may consist of a plurality.

An apparatus and method according to the present disclosure may display an enlarged image related to a pointing position desired by a user on a display by determining a UI screen in response to a simple user input.

Also, the apparatus and method according to the present disclosure may display an enlarged image of a pointing position corresponding to a user input, so that information requested by the user may be quickly provided.

In addition, the apparatus and method according to the present disclosure may display an enlarged image along a pointing position being changed in response to a user input, thereby intuitively providing information requested by the user.

Also, the apparatus and method according to the present disclosure may change a UI screen in real time based on a simple user input, such as a touch, a tap, a drag, and a click of the user, thereby quickly and accurately providing information requested by the user.

Effects that may be obtained in the disclosure are not limited to the effects mentioned above, and other effects not mentioned may be clearly understood by those skilled in the art from the description.

It should be understood that the disclosure described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope of the disclosure as defined by the following claims.

What is claimed is:

1. A method of operating a terminal configured to display an image obtained from an image capturing device, the method comprising:
    displaying through a display, a first user interface (UI) screen comprising a first image, wherein the first image has a first resolution;
    obtaining a first user input indicating a pointing position in the first image;
    recognizing an object in the first image;
    generating a first enlarged image of an enlargement target area corresponding to the pointing position, based on the first user input and the object, wherein the first enlarged image is generated from a second image having a second resolution higher than the first resolution;
    recognizing a position change of the object as the object moves;
    generating a second enlarged image of an area comprising a changed position of the pointing position according to the position change of the object; and
    displaying through the display, a second UI screen comprising the second enlarged image,
    wherein an input time of the first user input is greater than or equal to a preset threshold time, and the first image and the second image correspond to each other based on time and scene.

2. The method of claim 1, further comprising:
    transmitting an image request message, wherein the image request message includes information about the first image and the pointing position;
    receiving a response comprising the second image, wherein the second image is generated based on the pointing position information contained in the image request message, wherein the generating of the first enlarged image comprises:
    obtaining a second user input to determine the enlargement target area; and
    generating the first enlarged image based on the second user input.

3. The method of claim 2, wherein the first user input comprises at least one of a touch input, a click input, and a tap input, and
    the second user input comprises at least one of a scrolling input and a sliding touch input.

4. The method of claim 1, wherein the first enlarged image is displayed as an overlay above and near the pointing position in the first image.

5. The method of claim 1, further comprising:
    obtaining a third user input indicating a change in the pointing position in the first image;
    generating the third enlarged image related to an area comprising the pointing position being changed according to the third user input; and
    displaying a third UI screen comprising the third enlarged image.

6. The method of claim 5, wherein the third user input comprises a drag input consecutive to the first user input.

7. The method of claim 1, wherein the generating of the first enlarged image comprises:
    transmitting an image request message comprising information about the first image and information about the pointing position to a server;

receiving, from the server, a server image corresponding to the information about the first image and the information about the pointing position, which are comprised in the image request message; and generating the first enlarged image based on the server image.

8. The method of claim 1,
wherein the generating of the first enlarged image comprises generating the first enlarged image, when a distance between a position of the recognized object and the pointing position is less than or equal to a threshold value, and the input time of the first user input is greater than or equal to the preset threshold time.

9. The method of claim 8, wherein the displaying of the second UI screen further comprises displaying the first enlarged image as an overlap above and near the position of the recognized object.

10. The method of claim 1, wherein, when a plurality of first user inputs indicating a plurality of pointing positions in the first image are input,
the generating of the first enlarged image comprises generating a plurality of first enlarged images corresponding to the plurality of pointing positions, and
the displaying of the second UI screen comprises displaying the second UI screen further comprising each of the plurality of first enlarged images through the display.

11. A terminal configured to display an image obtained from an image capturing device, the terminal comprising a processor, wherein the processor is configured to control to display a first user interface (UI) screen comprising a first image through a display, wherein the first image has a first resolution, obtain a first user input indicating a pointing position in the first image, recognize an object in the first image, generate a first enlarged image related to an enlargement target area corresponding to the pointing position based on the first user input and the object, wherein the first enlarged image is generated from a second image having a second resolution higher than the first resolution,
recognize a position change of the object, generate a second enlarged image of an area comprising a changed pointing position according to the position change of the object, and display a second UI screen comprising the second enlarged image through the display, and
an input time of the first user input is greater than or equal to a preset threshold time, and the first image and the second image correspond to each other based on time and scene.

12. The terminal of claim 11, wherein the processor is further configured to obtain a second user input to determine the enlargement target area and generate the first enlarged image based on the second user input.

13. The terminal of claim 12, wherein the first user input comprises at least one of a touch input, a click input, and a tap input, and
the second user input comprises at least one of a scrolling input and a sliding touch input.

14. The terminal of claim 11, wherein the processor is further configured to control to obtain a third user input indicating a change in the pointing position in the first image, generate the third enlarged image related to an area comprising the pointing position being changed according to the third user input, and display a third UI screen comprising the third enlarged image.

15. The terminal of claim 11, further comprising a communicator configured to transmit and receive data,
wherein the processor is further configured to transmit an image request message comprising information about the first image and information about the pointing position to a server, receive, from the server, a server image corresponding to the information about the first image and information about the pointing position, which are comprised in the image request message, and generate the first enlarged image based on the server image.

16. The terminal of claim 11, wherein the processor is further configured to generate the first enlarged image, when a distance between a position of the recognized object and the pointing position is less than or equal to a threshold value, and the input time of the first user input is greater than or equal to the preset threshold time.

17. The terminal of claim 16, wherein the processor is further configured to control to display the first enlarged image as an overlay above and near the position of the recognized object.

18. A non-transitory computer-readable storage medium having instructions executable by a processor stored thereon, the instructions comprising:
instructions to display a first user interface (UI) screen comprising a first image obtained from an image capturing device, wherein the first image has a first resolution;
instructions to obtain a first user input indicating a pointing position in the first image;
instructions to recognize an object in the first image;
instructions to generate a first enlarged image of an enlargement target area corresponding to the pointing position, based on the first user input and the object, wherein the first enlarged image is generated from a second image having a second resolution higher than the first resolution;
instructions to recognize a position change of the object;
instructions to generate a second enlarged image of an area comprising a changed pointing position according to the position change of the object; and
instructions to display a second UI screen comprising the second enlarged image through a display,
wherein an input time of the first user input is greater than or equal to a preset threshold time, and the first image and the second image correspond to each other based on time and scene.

19. The non-transitory computer-readable storage medium of claim 18 having the instructions executable by the processor stored thereon, the instructions further comprising:
instructions to transmit an image request message comprising information about the first image and information about the pointing position to a server;
instructions to receive, from the server, a server image corresponding to the information about the first image and the information about the pointing position comprised in the image request message; and
instructions to generate the first enlarged image based on the server image.

20. The computer readable storage medium of claim 18 having the instructions executable by the processor stored thereon, the instructions further comprising:
instructions to generate the first enlarged image, when a distance between a position of the recognized object and the pointing position is less than or equal to a threshold value, and the input time of the first user input is greater than or equal to the preset threshold time.

* * * * *